United States Patent [19]

Serini et al.

[11] Patent Number: 5,512,632

[45] Date of Patent: *Apr. 30, 1996

[54] THERMOPLASTIC BLENDS CONTAINING POLYESTERS AND POLYESTER CARBONATES BASED ON SUBSTITUTED CYCLOALKYLIDENE BISPHENOLS

[75] Inventors: Volker Serini; Dieter Freitag, both of Krefeld; Ulrich Grigo, Kempen, all of Germany

[73] Assignee: Bayer Aktiengesellschaft, Leverkusen, Germany

[ * ] Notice: The term of this patent shall not extend beyond the expiration date of Pat. No. 5,041,521.

[21] Appl. No.: 25,702

[22] Filed: Mar. 3, 1993

Related U.S. Application Data

[63] Continuation of Ser. No. 584,564, Sep. 18, 1990, abandoned.

[30] Foreign Application Priority Data

Sep. 23, 1989 [DE] Germany ............................ 39 31 771.4

[51] Int. Cl.⁶ .................................................. C08L 67/03

[52] U.S. Cl. .......................... 525/67; 525/92 F; 525/146; 525/147; 525/148; 525/394; 525/425; 525/438; 525/439; 528/176

[58] Field of Search ...................... 525/439, 425, 525/146, 147, 394, 438, 92, 67; 528/176

[56] References Cited

U.S. PATENT DOCUMENTS

| | | | |
|---|---|---|---|
| 4,438,241 | 3/1984 | Mark | 525/444 |
| 4,554,330 | 11/1985 | Mark | 525/462 |
| 5,041,521 | 8/1991 | Serini | 528/176 |

FOREIGN PATENT DOCUMENTS

| | | |
|---|---|---|
| 304040 | 2/1989 | European Pat. Off. . |
| 362646 | 4/1990 | European Pat. Off. . |
| 3903103 | 2/1989 | Germany . |

*Primary Examiner*—Patricia A. Short
*Attorney, Agent, or Firm*—Joseph C. Gil; Aron Preis

[57] ABSTRACT

The invention relates to mixtures of special polyesters and/or special polyester carbonates with amorphous thermoplastics and/or with partly crystalline thermoplastics and/or with rubbers and/or with graft polymers useful for molding articles.

2 Claims, No Drawings

THERMOPLASTIC BLENDS CONTAINING POLYESTERS AND POLYESTER CARBONATES BASED ON SUBSTITUTED CYCLOALKYLIDENE BISPHENOLS

This application is a continuation of application Ser. No. 07/584,564 filed Sep. 18, 1990, now abandoned.

This invention relates to thermoplastic blends of

A) 1 to 99% by weight of at least one polyester and/or polyester carbonate of a) aromatic diphenols, $b_1$) aliphatic and/or cycloaliphatic and/or aromatic dicarboxylic acids and, optionally, $b_2$) carbonic acid, containing $b_1$) in a quantity of from 0.1 to 100 mol-% and, optionally, $b_2$) in a quantity of from 0 to 99.9 mol-%, based on ($b_1+b_2$), in which 0.1 to 100 mol-% of a) consists of diphenols corresponding to the following formula

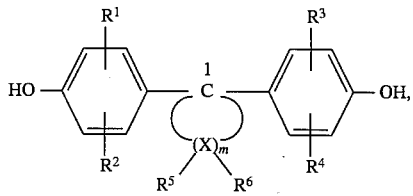

in which $R^1$, $R^2$, $R^3$ and $R^4$ independently of one another represent hydrogen, a $C_{1-12}$ hydrocarbon radical or a halogen atom m is an integer of 4 to 7, $R^5$ and $R^6$ are individually selected for each X and, independently of one another, represent hydrogen or $C_{1-6}$ alkyl and X is carbon, with the proviso that, for least one atom X, $R^5$ and $R^6$ are both alkyl, B) 0 to 99% by weight of at least one amorphous thermoplastic different from (A) having a glass temperature of 40° to 300° C., C) 0 to 99% by weight of at least one partly crystalline thermoplastic having a melting temperature of 60° to 400° C., D) 0 to 99% by weight of at least one rubber, E) 0 to 99% by weight of at least one graft polymer of at least one rubber with at least one grafted-on polymer of at least one monomer from the group consisting of vinyl compounds, acrylic and methacrylic compounds and maleic acid derivatives, in which the sum of A), B), C), D) and E) is 100% by weight.

The blends according to the invention have significant advantages. They combine high heat resistance and good melt flow with high thermal stability, even under the effect of atmospheric oxygen. They show particular structural viscosity which is of considerable use for processing by injection molding and extrusion. Injection molded parts are easy to demold. In addition, the blends are very tough, show particular tracking resistance and stability to hydrolysis and are stable to UV and γ rays. In addition, they are highly permeable to gases and show high selectivity for gas separations, for example for the separation of carbon dioxide/oxygen mixtures.

The thermoplastic blends according to the invention preferably contain 5 to 98% by weight, more preferably 10 to 95% by weight and, most preferably, 20 to 90% by weight of component A). They preferably contain 0 to 90% by weight, more preferably 0 to 75% by weight and, most preferably, 0 to 60% by weight of at least one amorphous thermoplastic (B). They preferably contain 0 to 90% by weight, more preferably 0 to 75% by weight and, most preferably, 0 to 60% by weight of at least one partly crystalline thermoplastic (C). They preferably contain 0 to 90% by weight, more preferably 0 to 75% by weight and, most preferably, 0 to 60% by weight of at least one graft polymer (E). In addition, they preferably contain 0 to 80% by weight, more preferably 0 to 60% by weight, most preferably 0 to 45% by weight and, more particularly, 0 to 30% by weight of at least one rubber (D).

In the thermoplastic blends according to the invention, the sum of the rubber (D) and the rubber component of the graft polymer (E) is preferably 0 to 80% by weight, more preferably 0 to 60% by weight, most preferably 0 to 45% by weight and, more particularly, 0 to 30% by weight.

Where component (B) is present in one of the blends according to the invention, its content is preferably at least 2% by weight, more preferably at least 5% by weight, most preferably at least 10% by weight and, more particularly, at least 20% by weight of the sum of components (A), (B), (C), (D) and (E) of this blend. The same also applies to components (C) and (E).

Where component (D) is present in one of the blends according to the invention, its content is preferably at least 2% by weight, more preferably at least 5% by weight and, most preferably, at least 10% by weight of the sum of components (A), (B), (C), (D) and (E) of this blend. The same also applies to the sum of the rubber component of components (D) and (E).

In addition to component A), the thermoplastic blends according to the invention preferably contain one or two other constituents from B), C), D) and E).

Particularly preferred thermoplastic blends are thermoplastic blends of component (A) and 1 to 99% by weight of at least one amorphous thermoplastic (B) or 1 to 99% by weight of at least one graft polymer (E). Blends of constituents A) and E) are particularly preferred.

Other particularly preferred blends are those of component (A) and 1 to 98% by weight, preferably 15 to 75% by weight and, more preferably, 30 to 60% by weight of at least one partly crystalline thermoplastic having a melting temperature of 60° to 400° C. (C) and i to 98% by weight, preferably 10 to 35% by weight and, more preferably, 15 to 25% by weight of at least one graft polymer of at least one rubber and at least one grafted-on polymer (E).

Other particularly preferred blends are thermoplastic blends of component (A) and 1 to 98% by weight, preferably 10 to 80% by weight and, more preferably, 20 to 60% by weight of at least one amorphous thermoplastic (B) having a glass temperature of 40° to 300° C. and of 1 to 98% by weight, preferably 10 to 80% by weight and more preferably 20 to 60% by weight of at least one graft polymer of at least one rubber and at least one grafted-on polymer (E).

Other particularly preferred blends are thermoplastic blends of component (A) and 1 to 98% by weight, preferably 10 to 80% by weight and, more preferably, 20 to 70% by weight of at least one amorphous thermoplastic (B) having a glass temperature of 40° to 300° C. and of 1 to 60% by weight, preferably 1 to 20% by weight and more preferably 2 to 5% by weight of at least one rubber (D).

The amorphous thermoplastics (B) have a glass temperature of preferably from 50° to 280° C., more preferably from 60° to 250° C. and most preferably from 80° to 230° C.

The partly crystalline thermoplastics (C) have melting temperatures of preferably from 70° to 350° C., more preferably from 80° to 320° C. and most preferably from 100° to 300° C.

The polyesters and polyester carbonates used in accordance with the invention are the subject of German patent application P 39 03 103.9 (Le A 26 313) and are polyesters and polyester carbonates of a) aromatic diphenols,
$b_1$) aliphatic and cycloaliphatic and/or aromatic dicarboxylic acids and, optionally,
$b_2$) carbonic acid, containing $b_1$) in a quantity of from 0.1 to 100 mol-% and, optionally, $b_2$) in a quantity of 0 to 99.9 mol-%, based on ($b_1+b_2$), characterized in that 0.1 to 100 mol-% of a) consists of diphenols corresponding to the following formula

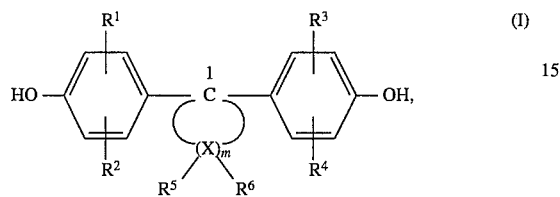

in which
$R^1$, $R^2$, $R^3$ and $R^4$ independently of one another represent hydrogen, a $C_{1-12}$ hydrocarbon radical or a halogen atom,
m is an integer of 4 to 7,
$R^5$ and $R^6$ are individually selected for each X and, independently of one another, represent hydrogen or $C_{1-6}$ alkyl and
X is carbon,
with the proviso that, at at least one atom X, $R^5$ and $R^6$ are both alkyl.

In formula (I), $R^1$, $R^2$, $R^3$ and $R^4$ are preferably hydrogen, methyl, ethyl, phenyl, cyclohexyl, chlorine or bromine, but more preferably hydrogen, methyl or bromine. If more than one of the substituents $R^1$, $R^2$, $R^3$ and $R^4$ is not hydrogen, identical substituents are preferred. If two of the substituents $R^1$, $R^2$, $R^3$ and $R^4$ are not hydrogen, the o,o'-substitution, based on the phenolic OH groups of formula (I), are preferred. If none of the four substituents $R^1$, $R^2$, $R^3$ and $R^4$ is hydrogen, the o,o,o',o'-substitution on the same basis as before is preferred.

In formula (I), m is preferably 4 to 5 and, more preferably, 5.

In addition, $R^5$ and $R^6$ in formula (I) are preferably both alkyl at 1 to 2 atoms X and, more preferably, at only 1 atom X. The preferred alkyl radical is methyl; the X atoms in the α-position to the diphenyl-substituted C atom (C 1) are preferably not dialkyl-substituted, whereas the X atoms in the β-position to C 1 are preferably dialkyl-substituted.

Bisphenols of formula (I) suitable for use in accordance with the invention are, for example, 1,1-bis-(4-hydroxyphenyl)-3,3-dimethyl-5-methyl cyclohexane,
1,1-bis-(4-hydroxyphenyl)-3,3-dimethyl-5,5-dimethyl cyclohexane,
1,1-bis-(4-hydroxyphenyl)-3,3-dimethyl-4-methyl cyclohexane,
1,1-bis-(4-hydroxyphenyl)-3,3-dimethyl-5-ethylcyclohexane,
1,1-bis-(4-hydroxyphenyl)-3,3-dimethyl-5-methyl cyclopentane,
1,1-bis-(3,5-dimethyl-4-hydroxyphenyl)-3,3-dimethyl-5-methyl cyclohexane,
1,1-bis-(3,5-diphenyl-4-hydroxyphenyl)-3,3-dimethyl-5-methyl cyclohexane,
1,1-bis-(3-methyl-4-hydroxyphenyl)-3,3-dimethyl-5-methyl cyclohexane,
1,1-bis-(3-phenyl-4-hydroxyphenyl)-3,3-dimethyl-5-methyl cyclohexane,
1,1-bis-(3,5-dichloro-4-hydroxyphenyl)-3,3-dimethyl-5-methyl cyclohexane,
1,1-bis-(3,5-dibromo-4-hydroxyphenyl)-3,3-dimethyl-5-methyl cyclohexane.

1,1-Bis-(4-hydroxyphenyl)-3,3-dimethyl-5-methyl cyclohexane is particularly preferred.

The dihydroxydiphenyl cycloalkanes corresponding to formula (I) suitable for use in accordance with the invention may be prepared in known manner by condensation of phenols corresponding to formula (II) and/or (III)

and ketones corresponding to formula (IV)

In formulae (II), (III) and (IV), X, $R^1$, $R^2$, $R^3$, $R^4$, $R^5$, $R^6$ and m are as defined for formula (I).

The dihydroxydiphenyl cycloalkanes corresponding to formula (I), in which all or some of the substituents $R^1$, $R^2$, $R^3$ and $R^4$ are halogen, may also be at least partly obtained by halogenation of the corresponding unsubstituted dihydroxydiphenyl cycloalkanes. For example, 1,1-bis-(4-hydroxyphenyl)- 3,3-dimethyl-5-methyl cyclohexane may be obtained by nucleus chlorination or nucleus bromination by methods known per se to 1,1-bis-(3,5-dichloro-4-hydroxyphenyl) -3,3-dimethyl-5-methyl cyclohexane or 1,1-bis-(3,5 -dibromo-4-hydroxyphenyl)-3,3-dimethyl-5-methylyclohexane.

Diphenols corresponding to formula (I) and their production are described in German patent application P 38 32 396.6.

Aromatic diphenols (component a) which may be used in addition to those of formula (I) for the synthesis of the polyesters and polyester carbonates to be used in accordance with the invention are, for example, hydroquinone, resorcinol, dihydroxydiphenyls, bis-(hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfones, α,α'-bis-(hydroxyphenyl) -isopropylbenzenes, pentamethyl-(hydroxyphenyl)-indanols and corresponding nucleus-substituted compounds.

These and other suitable aromatic dihydroxy compounds are described, for example, in Hermann Schnell, "Chemistry and Physics of Polycarbonates", Polymer Reviews 9, Interscience Publishers, New York 1964; in V. Serini, D. Freitag and H. Vernaleken, "Polycarbonate aus o,o,o',o'-tetramethylsubstituierten Bisphenolen (Polycarbonates of o,o,o',o' -Tetramethyl-Substituted Bisphenols)", Angewandte Makromolekulare Chemie 55 (1976), 175–189; in U.S. Pat. No.

3,028,365, 2,999,835, 3,148,172, 3,271,368, 2,991,273, 3,271,367, 3,780,078, 3,014,891 and 2,999,846; in DE-OSS 1 570 703, 2,063,050, 2,063,052, 2 211,957, 2,402,175, 2,402,176, 2,402,177 and in FR-PS 1 561 518.

Preferred diphenols are hydroquinone, bis-(4-hydroxyphenyl), 2,2-bis-(4-hydroxyphenyl)-propane, bis-(4-hydroxyphenyl)-sulfide, bis-(4-hydroxyphenyl)-ether, bis-(4-hydroxyphenyl)-ketone, bis-(4-hydroxyphenyl)-sulfone, bis-(4-hydroxyphenyl)-methane, 1,1-bis-(4-hydroxyphenyl)-cyclohexane, α,α'-bis-(4-hydroxyphenyl)-p-diisopropylbenzene, 1,1-bis-(4-hydroxyphenyl)-1-phenyl ethane, 2,2-bis-(3-methyl-4-hydroxyphenyl)-propane, 2,2-bis-(3,5-dichloro-4-hydroxyphenyl)-propane, 2,2-bis-(3,5-dibromo-4-hydroxyphenyl)-propane, 2,2-bis-(3,5-dimethyl-4-hydroxyphenyl) propane, bis-(3,5-dimethyl-4-hydroxyphenyl)-methane, 2,2-bis-(3,5-dimethyl-4-hydroxyphenyl)-butane , bis-(3,5'dimethyl-4-hydroxyphenyl) and 1,1,3,4,6-pentamethyl-3-(3,5-dimethyl-4-hydroxyphenyl)-indan-5-ol. Of these preferred diphenols, bis-(4-hydroxyphenyl), 2,2-bis-(4-hydroxyphenyl)-propane and 2,2-bis-(3,5-dimethyl-4-hydroxyphenyl) propane are particularly preferred and 2,2-bis-(4-hydroxyphenyl)-propane is more particularly preferred.

The following are examples of aliphatic, cycloaliphatic or aromatic dicarboxylic acids (component $b_1$) which are suitable for the synthesis of the polyesters and polyester carbonates to be used in accordance with the invention: oxalic acid, malonic acid, succinic, glutaric acid, adipic acid, pimelic acid, suberic acid, azelaic acid, sebacic acid, nonane dicarboxylic acid, decane dicarboxylic acid, dodecane dicarboxylic acid, octadecane dicarboxylic acid, dimethyl malonic acid, dimer fatty acid, 1,4-cyclohexane dicarboxylic acid, tetrahydroterephthalic acid, tetrahydroisophthalic acid, tetrahydrophthalic acid, 3,6-endomethylene tetrahydrophthalic acid, o-, m-, p-phenylene diacetic acid, orthophthalic acid, terephthalic acid, isophthalic acid, tert.-butyl isophthalic acid, 3,3'-diphenyl dicarboxylic acid, 4,4'-diphenyl dicarboxylic acid, 4,4'-benzophenone dicarboxylic acid, 3,4'-benzophenone dicarboxylic acid, 4,4'-diphenyl ether dicarboxylic acid, 4,4'-diphenyl sulfone dicarboxylic acid, 2,2-bis-(4-carboxyphenyl)-propane, trimethyl-3-phenylindane-4,5-dicarboxylic acid.

The polyesters and polyester carbonates to be used in accordance with the invention are preferably produced from aromatic dicarboxylic acids. Among the aromatic dicarboxylic acids, terephthalic acid and/or isophthalic acid are particularly preferred. Terephthalic acid is most particularly preferred.

The polyesters and polyester carbonates used in accordance with the invention, in which 1 to 100 mol-%, preferably 5 to 100 mol-%, more preferably 10 to 100 mol-% and, more particularly, 20 to 100 mol-% of the aromatic diphenols (component a) consist of diphenols corresponding to formula (I), are preferred. Among the polyesters and polyester carbonates in which 20 to 100 mol-% of the aromatic diphenols (component a) consist of those corresponding to formula (I), those containing 20 to 50 mol-% and 55 to 100 mol-% aromatic diphenols corresponding to formula (I) are preferred, those containing 10 to 40 mol-% and 70 to 100 mol-% of aromatic diphenols corresponding to formula (I) are particularly preferred, those containing 20 to 35 mol-% and 85 to 100 mol-% of aromatic diphenols corresponding to formula (I) are most particularly preferred and those containing 100 mol-% of aromatic diphenols corresponding to formula (I) are especially preferred.

The polyester carbonates to be used in accordance with the invention, in which the dicarboxylic acids (component $b_1$) are present in a quantity of 5 to 98 mol-%, preferably in a quantity of 10 to 95 mol-% and, more preferably, in a quantity of 15 to 95 mol-%, are preferred. Among these polyester carbonates, those in which the dicarboxylic acids (component $b_1$) are present in a quantity of 15 to 50 mol-% and 60 to 95 mol-% and more particularly in a quantity of 15 to 40 mol-% and 75 to 90 mol-%, based on the sum of the dicarboxylic acids (component $b_1$) and the carbonic acid (component $b_2$), are preferred.

The polyesters and polyester carbonates to be used in accordance with the invention may be produced by any of the methods known from the literature for the production of polyesters and polyester carbonates, for example by the process in homogeneous solution, by the melt transesterification process and by the two-phase interfacial process. They are preferably produced by the melt transesterification process and, more preferably, by the two-phase interfacial process.

Processes for the production of polyesters and polyester carbonates in homogeneous solution are described, for example, in DE-OS 1 420 475, in U.S. Pat. No. 3,169,121 and in U.S. Pat. No. 4,156,069 and in the monograph entitled Polymer Reviews, Volume 10, Condensation Polymers by Interfacial and Solution Methods, Paul W. Morgan, Interscience Publishers New York 1965, Chapter VIII, pages 325 et seq, Polyesters. For example, polyesters may be produced for example by reaction of dicarboxylic acid dichlorides with aromatic dihydroxy compounds in the presence of pyridine as acid acceptor and pyridine or chlorinated hydrocarbons, such as methylene chloride and chlorobenzene, as solvents.

Polyester carbonates may also be produced, for example, in homogeneous solution by using phosgene, dicarboxylic acids and aromatic dihydroxy compound or phosgene, dicarboxylic acid dichloride and aromatic dihydroxy compound as monomers. The reaction takes place sufficiently quickly even at low temperatures, for example at 10° to 40° C.

Melt transesterification processes for the production of polyesters and polycarbonates are, for example, the acetate process and the phenylester process.

The acetate process is described, for example, in U.S. Pat. No. 3,494,885 and 4,386,186 and in EP 26 120, 26 121, 26 684, 28 030, 39 845, 91 602, 97 970, in the monograph entitled Polyesters, V. V. Korshak and S. V. Vinograda, Pergamon Press, Oxford, 1965.and in the Article by V. V. Korshak and S. V. Vinograda, Chemiefasersymp., Abh. d. Akad. Wiss. Berlin 1 (1963), 355 et seq. In this process, bis-acetates of aromatic dihydroxy compounds, such as for example bisphenol A diacetate, are reacted with dicarboxylic acids, for example aromatic dicarboxylic acids, such as isophthalic acid and terephthalic acid, in the melt, generally at temperatures of 200° to 400° C., with elimination of acetic acid to form aromatic polyesters. Auxiliary solvents such as, for example, diphenyl ether, substituted cyclohexanes and decahydronaphthalene may be added to improve the melt flow of the polyester during the process and to prevent sublimation of the dicarboxylic acid.

The reaction may optionally be catalyzed, for example with alkali and alkaline earth compounds, Ti compounds, Zn compounds, Sn compounds, Sb compounds and Mn compounds. The condensation reaction may also be carried out, particularly in the case of crystallizing polyesters, by not conducting the condensation reaction completely in the melt, but only to the stage of a free-flowing prepolymer which is then subjected to solid-phase condensation below its melting point until the desired degree of condensation is reached. In this case, the further synthesis of the polymer is generally completed under reduced pressure at a temperature only slightly below the melting point of the polymer with further elimination and removal of acetic acid.

The phenyl ester process for the production of aromatic polyesters and polycarbonates is described, for example, in U.S. Pat. No. 4,661,580, 4,680,371, 4,680,372, EP 79 075, 146 887, 156 103, 234 913, 234 914, 240 301 and DAS 1 495 626, 2 232 877. In this process, aromatic dihydroxy compounds such as, for example, bisphenol A are reacted with aromatic dicarboxylic acid esters such as, for example, isophthalic acid diphenyl ester and terephthalic acid diphenyl ester in the melt, generally at temperatures of 200° to 400° C., with elimination of phenol to form aromatic polyesters. To produce polyesters by the process, it is also possible to react aromatic dihydroxy compounds, dicarboxylic acids and diesters of carbonic acid, such as diphenyl carbonate, as starting materials. In this case, the phenylesters of the dicarboxylic acids required for the reaction are intermediately formed with elimination of $CO_2$ and phenol.

To produce polyester carbonates by the phenylester process, diesters of carbonic acid, such as diphenyl carbonate, are generally used in addition to the diesters of the dicarboxylic acids. However, it is also possible to use only aromatic dihydroxy compounds, dicarboxylic acids and diphenyl carbonate for the production of the polyester carbonates. In the production of the polyester carbonates, the sum of dicarboxylic acid diesters and dicarboxylic acids used is generally smaller than the sum of bisphenols used, based on mol parts. As already been described for the acetate process, catalysts may also be used in the phenylester process to accelerate the condensation reaction, auxiliary solvents may be used and the prepolymer may be subjected to solid-phase condensation. The catalysts and auxiliary solvents may be the same as already described for the acetate process.

The two-phase interfacial process for the production of polyesters and polyester carbonates is described, for example, in EP 68 014, 88 322, 134 898, 151 750, 182 189, 219 708, 272 426 and in DE-OS 2 940 024, 3 007 934, 3 440 020 and in the monograph entitled Polymer Reviews, Volume 10, Condensation Polymers by Interfacial and Solution Methods, Paul W. Morgan, Interscience Publishers New York 1965, Chapter VIII, page 325, Polyesters.

Aromatic dihydroxy compounds, dicarboxylic acid dichlorides and phosgene are preferably used as starting components for the production of the polyesters and polyester carbonates to be used in accordance with the invention by the two-phase interfacial process.

Terephthalic acid and/or isophthalic acid may also be used in the two-phase interfacial process, dicarboxylic acid chlorides or dichlorides being intermediately formed by means of phosgene.

In the two-phase interfacial process, the polycondensation reaction takes place in a two-phase system of an aqueous-alkaline solution and a water-immiscible organic solvent. For example, the aromatic dihydroxy compound, dissolved in aqueous alkali as diphenolate, is reacted while stirring with the dicarboxylic acid dichloride and, optionally, phosgene dissolved in the organic solvent. The polyester or polyester carbonate formed is dissolved in the organic solvent. Where dicarboxylic acid dichloride and phosgene are used, i.e. where polyester carbonates are being produced, the dicarboxylic acid dichloride and the phosgene may be used in various ways. For example, it is possible initially to react only dicarboxylic acid chloride with the alkali bisphenolate and only then to add the phosgene required to complete the polycondensation. It is also possible, for example, to react the dicarboxylic acid dichloride and part of the phosgene required together with the bisphenolate and then to add the rest of the total quantity of phosgene required. The polycondensation is generally carried out in the presence of a catalyst. As described in more detail hereinafter, the catalyst may be added, for example, when the dicarboxylic acid chlorides and the phosgene have already reacted for a certain time with the alkali bisphenolate. However, it may also be added, at least partly, right at the beginning of the reaction. However, it is even possible to use different catalysts in one and the same condensation reaction, in which case the individual catalysts may be added at different times. In general, the polycondensation is carried out in the presence of chain stoppers. Branching agents, for example, may be used to obtain certain properties, including structural viscosity for example. Antioxidants may also be used in the reaction, for example to obtain very light-colored polycondensates.

Suitable water-immiscible organic solvents are, for example, chlorinated hydrocarbons, such as chloroform, dichloroethane, tri- and tetrachloroethylene, tetrachloroethane, dichloromethane, chlorobenzene and dichlorobenzene, and also non-chlorinated hydrocarbons, such as toluene and xylene. Chlorobenzene or dichloromethane or mixtures thereof are preferably used.

The chain stoppers used are compounds of the type known from polycarbonates, polyesters and polyester carbonates and include, for example, secondary amines, phenols and acid chlorides. Phenols, such as phenol and alkylphenol, are preferred, particular preference being attributed to those containing $C_{1-12}$ alkyl groups, such as p-tert.-butylphenol, m- and p-3,5-dimethylheptylphenol and m- and p-1,1,3,3-tetramethylbutylphenol, and also hydroxydiphenyl and p-cumenylphenol. It is especially preferred to use p-1, 1,3,3-tetramethylbutylphenol (p-isooctylphenol).

Small quantities, preferably quantities of 0.05 to 3.0 mol-% (based on diphenols used), of trifunctional or more than trifunctional compounds, particularly those containing 3 or more phenolic hydroxyl groups, are optionally used in known manner as branching agents to obtain branched polyesters or polyester carbonates. Some of the compounds containing three or more phenolic hydroxyl groups which may be used as branching agents are phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenyl methane, 2,2-bis-(4,4-bis-(4-hydroxyphenyl)-cyclohexyl)-propane, 2,4-bis-(4-hydroxyphenylisopropyl)-phenol, 2,6-bis-(2-hydroxy-5'-methylbenzyl)-4-methylphenol, 2-(4-hydroxyphenyl)-2-(2,4-dihdyroxyphenyl)-propane, hexa-(4-(4-hydroxyphenylisopropyl)-phenyl)-orthoterephthalic acid ester, tetra-(4-hydroxyphenyl)-methane, tetra-(4-(4-hydroxyphenylisopropyl)-phenoxy)-methane and 1,4-bis-((4',4"-dihydroxytriphenyl)-methyl)-benzene.

Some of the other trifunctional compounds are 2,4-dihydroxybenzoic acid, trimesic acid, cyanuric chloride and 3,3-bis-(3-methyl-4-hydroxyphenyl)-2-oxo-2,3-dihydroindole.

Tertiary amines and/or phase-transfer catalysts, such as quaternary ammonium and phosphonium compounds and/or crown ethers, may be used as catalysts. Preferred catalysts are, for example, N-ethyl piperidine, tetrabutyl ammonium bromide and/or triphenyl benzyl phosphonium bromide.

The polyesters and polyester carbonates to be used in accordance with the invention generally have average molecular weights $\overline{M}w$ of at least 10,000, preferably from 10,000 to 250,000 and more preferably from 15,000 to 80,000.

Additives typically used for thermoplastic polyesters and polyester carbonates, including for example stabilzers, mold release agents, pigments flameproofing agents, antistatic agents, conductivity additives, fillers and reinforcing materials, may be added in the usual quantities to the polyesters and polyester carbonates to be used in accordance with the invention before or during their processing.

More particularly, it is possible, for example, to add graphite, carbon black, metal fibers, metal powders, kieselguhr, quartz, kaolin, mica, clays, $CaF_2$, $CaCO_3$, aluminium oxides, aluminium nitride, silicates, barium sulfate, glass fibers, carbon fibers, ceramic fibers and inorganic and organic pigments and, as mold release agents, for example esters of polyhydric alcohols with long-chain carboxylic acids, such as glycerol stearates, pentaerythritol tetrastearate and trimethylol propane tristearate.

Examples of amorphous thermoplastics which may be used in accordance with the invention as constituent B) of the blends are aromatic polycarbonates, aromatic polycarbonates containing incorporated polysiloxane blocks, incorporated aliphatic polyether blocks or incorporated aliphatic polyester blocks, aromatic polyesters with no co-condensed diphenols of formula (I), aromatic polyester carbonates with no co-condensed diphenols of formula (I), aliphatic-aromatic polyesters with no co-condensed diphenols of formula (I), amorphous, thermoplastic polyamides, polyarylene sulfones, aromatic polyethers, aromatic polyimides, polyepoxides, vinyl polymers and (meth) acrylic polymers.

Of these examples, the aromatic polycarbonates, aromatic polycarbonates containing incorporated polysiloxane blocks, aromatic polyesters with no co-condensed diphenols of formula (I), aromatic polyester carbonates with no co-condensed diphenols of formula (I), aliphatic-aromatic olyesters with no co-condensed diphenols of formula (I), polyamides and vinyl polymers are preferred, the aromatic polycarbonates, the aromatic polycarbonates containing incorporated polysiloxane blocks, aliphatic-aromatic polyesters with no co-condensed diphenols of formula (I), the polyamides and the vinyl polymers being particularly preferred.

Aromatic polycarbonates suitable in accordance with the invention as constituent B) of the blends are those based on diphenols, particularly diphenols corresponding to formula (V)

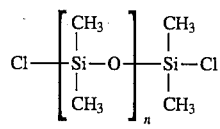  (V)

in which Z is an aromatic $C_{6-30}$ radical which may contain one or more aromatic nuclei which may be substituted. Diphenols corresponding to formula (V), not including the diphenols of formula (I), were described in the foregoing as component (a) for the synthesis of the polyesters and polyester carbonates according to the invention. The particularly preferred diphenol is 2,2-bis-(4-hydroxyphenyl) propane (bisphenol A).

They may be both homopolycarbonates and copolycarbonates and may be both linear and branched.

The molecular weights $\overline{M}w$ (weight average molecular weight, as determined by gel permeation chromatography in tetrahydrofuran) of the other thermoplastic polycarbonates are in the range from 10,000 to 300,000 and preferably in the range from 12,000 to 150,000.

The polycarbonates of component B) are known in principle or may be obtained by known methods.

Polycarbonate-polysiloxane block copolymers, in which the polycarbonate component consists of at least one aromatic bisphenol of formula (V), may also be used as component B) of the blends. The polysiloxane blocks may be incorporated in the polycarbonate-polysiloxane block copolymer, for example, by introducing Cl- or bisphenol-terminated polysiloxanes into the polycarbonate reaction, for example by the two-phase interfacial process. Polysiloxanes of this type are, for example, polydimethyl siloxanes corresponding to formulae (VI) and (VII)

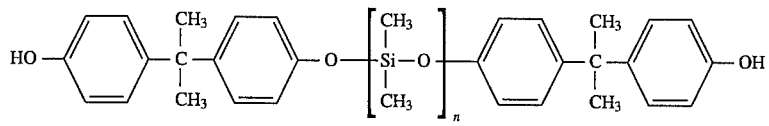

which have average degrees of polycondensation n of 5 to 200. These and other suitable polysiloxane blocks are widely described in the literature. The siloxane content of the polycarbonate-polysiloxane block copolymers may be varied within wide limits, for example from 0.1 to 80% by weight, depending on the desired properties of the block copolymer. The production of suitable polysiloxane blocks incorporable in polycarbonate and the synthesis of polycarbonate-polysiloxane copolymers is described, for example, in U.S. Pat. No. 3,189,662, DE-PS 1 595 790, DE-PS 2 411 123, DE-OS 2 411 363, EP-A-216 106 and DE-OS 3 506 472.

Component B) of the blends may also consist, for example, of polycarbonate-polyether block copolymers and polycarbonate-polyester block copolymers containing aliphatic polyether blocks, for example polyethylene oxide, polypropylene- oxide add, preferably, plybutylene oxide blocks, or aliphatic polyester blocks, for example of hexanediol/adipic acid polyester or hexanediol/dimer fatty acid polyester. Block copolymers of this type and their production are described in DE-OS 2 636 783, 2 636 784, 2 827 325, 2 726 376, 2 726 416, 2 726 417, 2 712 435 and 2 702 626.

Aromatic polyesters and polyester carbonates suitable for use in accordance with the invention as component B) of the blends are made up of at least one aromatic bisphenol corresponding to formula (V), but with no co-condensed diphenols of formula (I), of at least one aromatic dicarboxylic and, optionally, of carbonic acid. Suitable aromatic dicarboxylic acids are, for example, orthophthalic acid, terephthalic acid, isophthalic acid, tert.-butyl isophthalic acid, 3,3'-diphenyl dicarboxylic acid, 4,4'-diphenyl dicarboxylic acid, 4,4'-benzophenone dicarboxylic acid, 3,4'-benzophenone dicarboxylic acid, 4,4'-diphenyl ether dicarboxylic acid, 4,4'-diphenylsulfone dicarboxylic acid, 2,2-bis-(4-carboxyphenyl)-propane, trimethyl-3-phenyl indane-4',5-dicarboxylic acid.

Of the aromatic dicarboxylic acids, terephthalic acid and/or isophthalic acid are particularly preferred. The particularly preferred bisphenol is 2,2-bis-(4-hydroxyphenyl)-propane (bisphenol A).

Aromatic polyesters and polyester carbonates may be produced by known methods of the type known from the literature for the production of polyesters and polyester carbonates, for example by processes in homogeneous solution, by melt transesterification processes and by the two-phase interfacial process. Melt transesterification processes are preferred, although the two-phase interfacial process is particularly preferred.

Melt transesterification processes (acetate process and phenylester process) are described, for example, in U.S. Pat. No. 3,494,885, 4,386,186, 4,661,580, 4,680:371: and 4,680, 372; in EP-A-26 120, 26 121, 26 684, 28 030, 39 845, 91 602, 97 970, 79 075, 146 887, 156 103, 234 913, 234 919 and 240 301 and in DE-ASS 1 495 626 and 2 232 877. The two-phase interfacial process is described, for example, in EP-A-68 014, 88 322, 134 898, 151 750, 182 189, 219 708 and 272 426, in DE-OSS 2 940 024, 3 007 934 and 3 440 020 and in Polymer Reviews Volume 10, Condensation Polymers by Interfacial and Solution Methods, Paul W. Morgan, Interscience Publishers New York, 1965, Chapter VIII, page 325, Polyesters.

In the acetate process, bisphenol diacetate or bisphenol and acetanhydride and also an aromatic dicarboxylic acid are generally condensed with elimination of acetic acid to form the polyester. In the phenylester process, bisphenol, an aromatic dicarboxylic acid or the diphenyl ester of the aromatic dicarboxylic acid and, optionally, diphenyl carbonate are generally reacted with elimination of phenol and, optionally, $CO_2$ to form the polyester or polyester carbonate. In the two-phase interfacial process, alkali bisphenolate, an aromatic dicarboxylic acid dichloride and, optionally, phosgene are used as starting materials for the production of polyesters or polyester carbonates. In this condensation reaction, the polyester or the polycarbonate is prepared with formation of alkali chloride. In general, the salt formed is dissolved in the aqueous phase while the polyester formed or the polyester carbonate formed is present in solution in the organic phase and is isolated therefrom.

Aliphatic-aromatic polyesters which may Be used as component B) of the blends are, for example, amorphous olyesters of cyclohexane-1,4-dimethanol and terephthalic acid and/or isophthalic acid which may contain other dicarboxylic acids and aliphatic dihydrox compounds, for example glycol, propylene glycol and butylene glycol, in o-condensed form as comohomers. Examples of polyesters of this type are cyclohexane-1,4-dimethanol/terephthalic acid polyester, cyclohexane-1,4-dimethanol/terephthalic acid/isophthalic acid copolyester and cyclohexane- 1,4-dimethanol/terephthalic acid/ethylene glycol -copolyester. Polyesters such as these are described, for example, in EP-A-273 151, 273 152, 155 989, 226 974, 185 309, 152 825, 226 189 and 272 416 and in U.S. Pat. Nos. 4,188,314 and 4,634,737.

Amorphous thermoplastic polyamides which may be used as component B) of the blends may be obtained, for example, by polycondensation of diamines, such as ethylenediamine, tetramethylenediamine, hexamethylenediamine, decamethylenediamine, 2,2,4- and 2,4,4-trimethyl hexamethylenediamine, m- and p-xylylenediamine, bis-(4-aminocyclohexyl)-methane, mixtures of 4,4'- and 2,2'-diaminodicyclohexyl methanes,. 2,2-bis-(4-aminocyclohexyl)-propane, 3,3'-dimethyl-4,4'-diaminodicyclohexyl methane, 3-aminoethyl-3,5,5-trimethyl cyclohexylamine, 2,5-bis-(aminomethyl)-norbornane, 2,6-bis-(aminomethyl)-norbornane, 1,4-diaminomethylcyclohexane and mixtures of these diamines with dicarboxylic acids, for example oxalic acid, adipic acid, azelaic acid, decane dicarboxylic acid, heptadecane dicarboxylic acid, 2,2,4-trimethyl adipic acid, 2,4,4-trimethyl adipic acid, isophthalic acid, terephthalic acid, and with mixtures of these dicarboxylic acids. Accordingly, copolyamides obtained by polycondensation of several of the diamines and/or dicarboxylic acids mentioned above are also included, as are amorphous copolyamides which have been prepared using ω-aminocarboxylic acids, such as ω-aminocaproic acid, ω-aminoundecanoic acid or ω-aminolauric acid, or lactams thereof.

Particularly suitable, amorphous, thermoplastic polyamides are those obtainable from isophthalic acid, hexamethylenediamine and other diamines, such as 4,4'-diaminodicyclohexyl methane, isophoronediamine, 2,2,4- and/or -2,4,4-trimethyl hexamethylenediamine, 2,5- and/or 2,6-bis-(aminomethyl)-norbornane; those obtainable from isophthalic acid, 4,4'-diaminodicyclohexyl methane and ω-caprolactam; those obtainable from isophthalic acid, 3,3'-dimethyl-4,4'-diaminodicyclohexyl methane and ω-lauric lactam; and those obtainable from terephthalic acid and from 2,2,4- and/or 2,4,4-trimethyl hexamethylenediamine.

Instead of using pure 4,4'-diaminodicyclohexyl methane, it is also possible to use mixtures of the position-isomeric diaminodicyclohexyl methanes which are made of 70 to 99 mol-% of the 4,4'-diamino isomer, 1 to 30 mol-% of the 2,4'-diamino isomer, 0 to 2 mol-% of the 2,2'-diamino isomer
and, optionally, correspondingly more highly condensed diamines obtained by hydrogenation of diaminodiphenyl methane of mechanical quality.

The amorphous polyamides and their production are known (see for example Ullmann, Enzyklopädie der technischen Chemie, Vol. 19, page 50).

Polyarylene sulfones which may be used as component B) of the blends generally have average molecular weights $\overline{M}w$ (weight average; as measured by the light scattering method in $CHCl_3$) in the range from 10,000 to 200,000 and preferably in the range from 20,000 to 90,000. Examples are the polyarylene sulfones obtainable by known methods from 4,4'-dichlorodiphenyl sulfone and at least one bisphenol, more especially 2,2-bis-(4-hydroxyphenyl)-propane and bis-(4 -hydroxyphenyl)-sulfone, which lead for example to polyarylene sulfones containing difunctional sulfone structural units corresponding to formulae (VIII) and (IX).

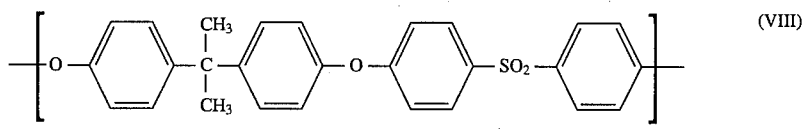
(VIII)

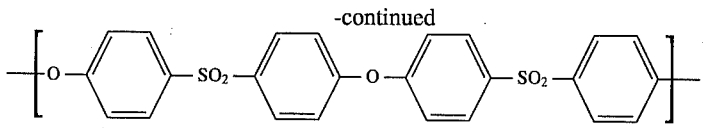

These polyarylene sulfones are known (see for example U.S. Pat. No. 3,264,536, DE-AS 1 794 171, GB-PS 1,264,900, U.S. Pat. No. 3,641,207, EP-A-0 038 028, DE-OS 3 601 419 and DE-OS 3 601 420, EP 149 359, EP 294 773 and the Articles by G. Blinne et al, Kunststoffe 75/1 (1985) 29–34 and by R. N. Johnson et al, Journal of Polymer Science, Part A1, 5 (1967), 2375– 2398. The suitable polyarylene sulfones may also be branched in known manner (see for example DE-OS 2 305 413).

Aromatic polyethers which may be used in accordance with the invention as component B) of the blends are, for example, polyphenylene oxides. Polyphenylene oxides are known and are described, for example, in U.S. Pat. Nos. 3,306,874, 3,306,875, 3,257,357, 3,257,358, 3,661,848, 3,219,625, 3,378,505, 3,639,656, 4,011,200, 3,929,930, EP-A-0 248 526, 0 271 699, DE-OS 2 126 434. The molecular weights $\overline{M}w$ (weight average) are generally in the range from 10,000 to 80,000 and preferably in the range from 15,000 to 60,000. Polyphenylene oxides are generally obtained as homopolymers or copolymers by an oxidative coupling reaction of one or more di- or trisubstituted phenols. A copper-amine complex is generally used to catalyze the reaction. Copper-amine complexes of primary, secondary and/or tertiary amines may be used. The following are examples of suitable homopolyphenylene oxides:
poly-(2,3-dimethyl-6-ethylphenylene-1,4-ether),
poly-(2,3,6-trimethylphenylene-1,4-ether),
poly-(2,4'-methylphenylphenylene-1,4-ether),
poly-(2-bromo-6-phenylphenylene-1,4-ether),
poly-(2-methyl-6-phenylphenylene-1,4-ether),
poly-(2-phenylphenylene-1,4-ether),
poly-{2-chlorophenylene-1,4-ether),
poly-(2lmethytphenylene-1,4-ether),
poly-(2-chloro-6-ethylphenylene-1,4-ether),
poly-(2-chloro-6-bromophenylene-1,4-ether),
poly-(2,6-di-n-propylphenylene-1,4-ether),
poly-(2-methyl-6-isopropylphenylene-1,4-ether),
poly-(9-chloro-6-methylphenylene-1,4-ether),
poly-(2-methyl-6-ethylphenylene-1,4-ether),
poly-(2,6-dibromophenylene-1,4-ether),
poly-(2,6-dichlorophenylene-1,4-ether),
poly-(2,6-diethylphenylene-1,4-ether) and
poly-(2,6-dimethylphenylene-1,4-ether).

Suitable copolymeric polyphenylene oxides may be produced, for example, from two or more phenols which are used for the production of the homopolyphenylene oxides mentioned above. Poly-(2,6-dimethylphenylene-1,4-ether) is particularly preferred. Graft and block copolymers of polyphenylene oxides and aromatic polyvinyl compounds, such as polystyrene, are also suitable as component B) of the blends. Suitable styrene-grafted polyphenylene oxides are described, for example, in the Article entitled "Xyron" in Japanese Plastics Age, March/April 1979, pages 29–33.

Aromatic polyimides which may be used as component B) of the blends are, for example, aromatic polyether imides of the type described in U.S. Pat. Nos. 4,395,518 and 3,855,178, in EP-A-120 183, 120 184, 179 471, 292 243, 278 066, in DE-PS 2 735 501 and in the Articles entitled "Polyetherimid (Polyetherimide)", Kunststoffe-Plastics 4/1982, pages 32– 35, "Polyetherimide ("Polyetherimides)" in Kunststoffe 73/5 (1983), pages 266–269; R. O. Johnson and H. S. Burlhis, J. of Pol. Sc., Polymer Symp. 7.0 (1983), pages 129–143 and D. M. White et al., J. of Pol. Sc., Pol. Chemistry Ed., 19 (1981) pages 1635–1685. As described in those Articles, these polyetherimides may be synthesized, for example, by reaction of bisnitrobisphthalimides and alkali bisphenolates with elimination of alkali nitrite or by reaction of bisether bisphthalic anhydrides with aliamines with elimination of water. A preferred aromatic polyetherimide consists, for example, of recurring units corresponding to formula (X):

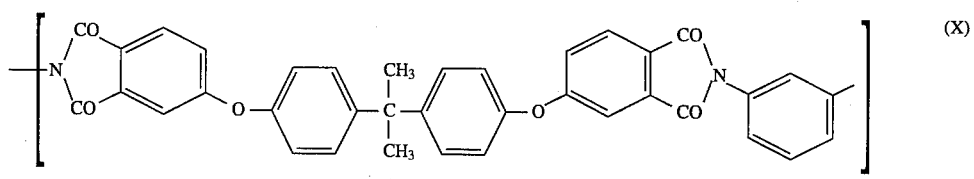

Polyepoxides which may be used as component B) of the blends are, for example, polyepoxides of the type obtainable from epichlorohydrin and bisphenols, for example bisphenol A, by known methods. Formula (XI) represents a particularly preferred epoxide in which n may assume a value of, for example, 5 to 200:

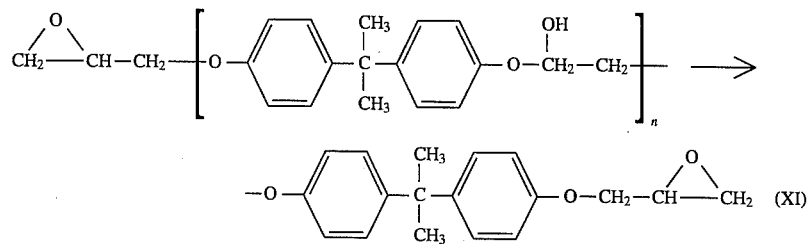

Vinyl polymers and (meth)acrylic polymers which may be used as component (B) of the blends are homopolymers and copolymers, for example of the following monomers:

1. Styrene and derivatives thereof, such as for example α-methyl styrene, α-chlorostyrene, p-chlorostyrene, 2,4-dichlorostyrene, p-methylstyrene, 3,4-dimethylstyrene, o- and p-divinylbenzene, p-methyl-α-methylstyrene and p-chloro-α-methylstyrene, preferably styrene and α-methylstyrene.
2. Acrylic and methacrylic compounds such as, for example, acrylic and methacrylic acid, acrylonitrile, methacrylonitrile, methyl acrylate, ethyl acrylate, n-and isopropyl acrylate, n- and isobutyl acrylate, tert.-butyl acrylate, 2-ethyl hexyl acrylate, methyl methacrylate, ethyl methacrylate, n- and isopropyl methacrylate, n- and isobutyl methacrylate, tert. butyl methacrylate, cyclohexyl methacrylate and isobornyl methacrylate, preferably acrylonitrile, methacrylonitrile, methyl methacrylate, tert.-butyl methacrylate.
3. Maleic anhydride and derivatives thereof, such as maleic acid esters, maleic acid diesters and maleic imides, for example alkyl and aryl maleic amides, such as for example methyl or phenyl maleic imide, preferably maleic anhydride and maleic imides, more preferably phenyl maleic imide.

The monomers of group 3 generally serve as comonomers to the monomers of groups 1 and 2.

Examples of suitable homopolymers and copolymers are polystyrene, polymethyl methacrylate, styrene/methylstyrene copolymers, styrene/acrylonitrile copolymers, α-methylstyrene/acrylonitrile copolymers, styrene/maleic anhydride copolymers, styrene/phenyl maleic imide copolymers, styrene/methyl methacrylate copolymers, methyl methacrylate/acrylonitrile copolymers, styrene/acrylonitrile/maleic anhydride copolymers, styrene/acrylonitrile/phenyl maleic imide copolymers, α-methylstyrene/acrylonitrile/methyl methacrylate copolymers, α-methyistyrene/acrylonitrile/tert.-butyl methacrylate copolymers, styrene/acrylo-nitrile/tert.-butyl methacrylate copolymers.

The vinyl polymers and (meth)acrylic polymers may be prepared by known radical, anionic and cationic polymerization processes. The known redox polymerization or the known polymerization with organometallic mixed catalysts may also be advantageous. The polymerization may be carried out in bulk, solution or emulsion, as already known.

Mixed processes, such as solution, precipitation or bulk suspension processes, may also be used, as already known. The weight average molecular weights of the vinyl polymers and (meth)acrylic polymers are generally in the range from 10,000 to 300,000 and preferably in the range from 30,000 to 200,000.

Examples of partly crystalline thermoplastics suitable for use in accordance with the invention as component C) of the blends are polyolefins, ionomers, aliphatic-aromatic polyesters with no co-condensed diphenols of formula (I), polyamides, aromatic polyether ketones and polyphenylene sulfides. Aliphatic-aromatic polyesters with no co-condensed diphenols of formula (I) and the polyamides are particularly preferred.

According to the invention, partly crystalline polyolefins may be used as component C) of the blends. Partly crystalline polyolefins are, for example, homopolymers and copolymers of olefins, such as for example ethylene, propylene, 1-butene, 1-pentene, 1-hexene, 1-heptene, 3-methyl-1-butene, 4-methyl- 1-butene, 4-methyl-1-pentene, 1-octene and others. Some of these polyolefins are polyethylene, polypropylene, 1-polybutene, poly-4-methyl-1-pentene. There are various types of polyethylene, namely: PE, HDPE (high-density), LDPE (low-density) and LLDPE (very low density). The different densities of the polyethylene are attributable to different processes and co-condensation with other monomers, as already known. Known processes for the production of polyolefins are, for example, the high-pressure process and the low-pressure process (Ziegler-Natta catalysis with organometallic mixed catalysts).

Preferred polyolefins C) are polyethylene and poly-4-methyl-1-pentene, polyethylene being particularly preferred. In addition to the olefins, the polyolefins may also contain small quantities of other monomers.

According to the invention, ionomers are also suitable as component C) of the Blends. Ionomers are generally polyolefins as described above, more especially polyethylene, which contain co-condensed monomers bearing acid groups, such as for example acrylic acid, methacrylic acid. The acid groups are converted by metal ions, such as for example $Na^+$, $Ca^{++}$, $Mg^{++}$ and $Al^{+++}$, into ionic, optionally ionically crosslinked polyolefins which can still be processed as thermoplastics. Polymers such as these are, for example, ethylene/acrylic acid copolymers of which the acid groups are converted into metal-salt-like groups. Ionomers such as these are described, for example, in U.S. Pat. Nos. 3,264,272, 3,404,134, 3,355,319, 4,321,337.

Preferred aromatic-aliphatic polyesters which may be used as partly crystalline component C) of the blends are polyalkylene terephthalates, i.e. for example those based on ethylene glycol, propane-1,3-diol, butane-1,4-diol, hexane-1,6-diol and 1,4-bis-hydroxymethyl cyclohexane. It is particularly preferred to use polybutylene terephthalates, polyethylene terephthalates and copolymers of cyclohexane-1,4-dimethanol and ethylene glycol and also terephthalic acid, providing they are partly crystalline. Polybutylene terephthalate is especially preferred.

The molecular weights $\overline{M}w$ (weight average) of these polyalkylene teraphthalates are generally in the range from 10,000 to 200,000 and preferably in the range from 10,000 to 80,000. The polyalkylene terephthalates may be obtained by known methods, for example from terephthalic acid dialkyl ester and the corresponding diol by transesterification (see for example U.S. Pat. Nos. 2,647,885, 2,643,989, 2,534,038, 2,578,660, 2,742,494, 2,901,466).

Partly crystalline polyamides suitable as component C) of the blends are, in particular, polyamide-6, polyamide-6,6, polyamide-4,6 and partly crystalline copolyamides based on the monomers on which these polyamides are based. Other suitable partly crystalline polyamides are those of which the acid component in particular consists completely or partly (for example in addition to ε-caprolactam) of adipic acid and/or terephthalic acid and/or isophthalic acid and/or suberic acid and/or sebacic acid and/or azelaic acid and/or dodecane dicarboxylic acid and/or a cyclohexane dicarboxylic acid, and of which the diamine component consists completely or partly of, in particular, m- and/or p-xylylenediamine and/or hexamethylenediamine and/or 2,2,4- and/or 2,4,4-trimethyl hexamethylenediamine and/or isophoronediamine and of which the compositions are known in principle from the prior art (see for example Encyclopedia of Polymers, Vol. 11, pages 315 et seq).

Partly crystalline polyamides produced completely or partly from $C_{6-12}$ lactams, optionally using one or more of the starting components mentioned above, are also suitable.

Particularly preferred partly crystalline polyamides are polyamide-6 and polyamide-6,6 or copolyamides containing a small amount, for example up to about 10% by weight, of other co-components.

Aromatic polyether ketones of the type described, for example, in GB-PS 1,078,234, U.S. Pat. No. 4,010,147, EP 135 938, 292 211, 275 035, 270 998, 165 406, JA 62 151 421 and in the Articles by C. K. Sham et al., Polymer 29/6 (1988), pages 1016–1020 and by J. E. Harris .et al., J. Appl. Polym. Sc. 35/7 (1988), pages 1877–1891, may also be used as partly crystalline component C) of the blends. These polyether ketones may be obtained, for example, by reaction of bisphenols with bis-(haloaryl)-ketones in polar aprotic solvents in the presence of alkali carbonates. For example, polymers containing difunctional structural units corresponding to formula (XII) below may be obtained by reaction of hydroquinone with 4,4'-difluorobenzophenone of polymers containing difunctional structural units corresponding to formula (XIII) below may be obtained by reaction of bis-(4-hydroxyphenyl)-ketone with 4,4'-difluorobenzophenone:

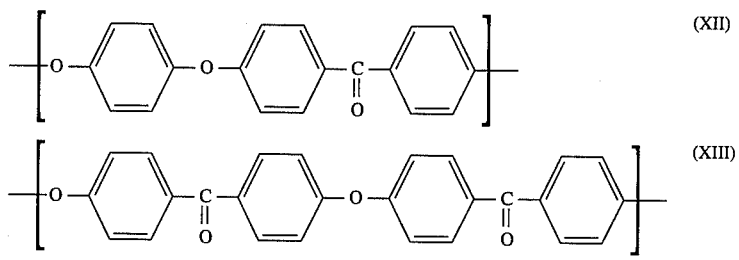

These polymers represent preferred polyether ketones.

Other polymers which may be used as a partly crystalline component C) of the blends are thermoplastic linear or branched polyarylene sulfides. They contain structural units corresponding to general formula (XIV)

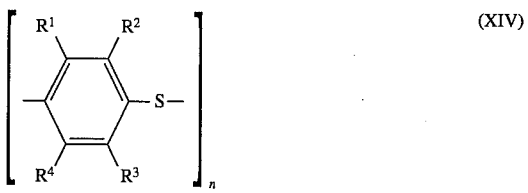

in which $R^1$ to $R^4$ independently of one another represent $C_{1-6}$ alkyl, phenyl or hydrogen. The polyarylene sulfides may also contain diphenyl units. The most significant is the polyarylene sulfide in which $R^1$ to $R^4$=H.

Polyarylene sulfides and their production are known and are described, for example, in U.S. Pat. Nos. 3,354,129, 3,786,035, 3,853,824, 3,856,560, 3,862,095 and in EP-A-O 171 021, in the contribution by W. Baerecke in International Polymer Science and Technology, Vol. 1, No. 9, 1974, pages T/52–T/ 54 and by A. S. Wood, Mod. Plast. Int. 18/4 (1988), pages 34–37.

Thermoplastic rubbers may be used as the rubbers (D). Thermoplastic rubbers are, for example, thermoplastic polyurethanes, polyether esters, polyesteramides, polyetheramides, polyether imideesters, thermoplastic olefin elastomers, ethylene/ethyl acrylate copolymers, stryene/butadiene segment polymers, styrene/isoprene segment polymers, hydrogenated styrene/butadiene segment polymers. Thermoplastic polyurethanes, polyether esters and, in particular, hydrogenated styrene/butadiene segment polymers are preferably used.

Thermoplastic polyurethanes are produced, for example, from three components, namely long-chain bifunctional polyols, short-chain diols or diamine and diisocyanate. The three components are reacted, for example, at starting temperatures of 60° to 140° C. with vigorous stirring. The isocyanate groups react with the hydroxyl groups to form urethane groups with no elimination of secondary products. After size reduction and storage for several days, the elastomer may be processed as a thermoplastic. Suitable long-chain polyols are, for example, ethanediol polyadipate, butane-1,4-diol polyadipate, ethanediol/butanediol polyadipate, hexane-1,6-diol/neopentyl glycol polyadipate, 1,2-propylene glycol polyether, tetramethylene oxide (=tetrahydrofuran polyether), hexane-1,6-diol polycarbonate and polycaprolactone.

Suitable short-chain diols or aliamines (chain extenders) are, for example, ethanediol, butane-1,4-diol, hexane-1,6-diol, hydroquinone di-β-hydroxyethyl ether and isophorone diamine.

Suitable diisocyanates are, for example, 4,4'-(diphenyl methane diisocyanate (MDI), hexamethylene diisocyanate (HDI), isophorone diisocyanate (IPDI) and 1,5-naphthylene diisocyanate (NDI).

Thermoplastic polyurethanes and their production are described, for example, in the Article by W. Goyert et al, Kunststoffe, Vol. 68, 1978, pages 2–8; in the monograph by J. H. Saunders et al, Polyurethanes, Chemistry and Technology, Vol. II, pages 299–451, Interscience Publishers, New York, 1964; and in U.S. Pat. Nos. 2,729,618 and 3,214,411.

Suitable polyether esters are, for example, block copolymers of soft segments, such as polytetramethyl glycol or polypropylene glycol or polyethylene glycol terephthalate, and hard segments of polybutylene terephthalate, as described for example in J. W. Crary, GAK 7/1986, Vol. 39, pages 330–334, and G. K. Hoeschele, Chimica 28/9 (1974), pages 544–552.

Suitable polyesteramides and polyetherimides are described, for example in EP-A-126 928, DE-OS 2 523 991, EP-A281 461 and in Kunststoffe 72/5 (1982), pages 282–283. Polyetheramides are, for example, block copolymers of polyether segments, such as polyethylene glycol, polypropylene glycol and polybutylene glycol, and polyamide segments, such as PA 6, PA 66, PA 11, PA 12, PA 611, PA 612.

Polyetherimide esters are described, for example, in U.S. Pat. No. 4,556,705 and in EP-A-O 318 786. In general, polyetherimide esters are reaction products of one or more low molecular weight diols, at least one dicarboxylic acid and at least one polyoxyalkylene diimide dicarboxylic acid.

Suitable styrene/butadiene, styrene/isoprene and hydrogenated styrene/butadiene segment-polymers are described, for example, in U.S. Pat. Nos. 3,333,024, 3,753,936 and 3,281,383, in DE-PS 2 819 493 and in DE-OS 2 613 200 and 2 643 757. The SBS block copolymers and the hydrogenated SBS block copolymers (SEBS=styrene/ethylene/butylene/ styrene block copolymers) are preferred.

Other rubbers than the thermoplastic rubbers mentioned above may also be used as the rubbers (D). Rubbers such as these are, for example, natural rubber, epichlorohydrin rubbers, ethylene/vinyl acetate rubbers, polyethylene chlorosulfonate rubbers, silicone rubbers, polyether rubbers, diene rubbers, hydrogenated diene rubbers, polyalkenamer rubbers, acrylate rubbers, ethylene/propylene rubbers, ethylene/ propylene/diene rubbers, butyl rubbers, fluorinated rubbers.

Silicone rubbers, diene rubbers, hydrogenated diene rubbers, acrylate rubbers, ethylene/propylene/diene rubbers (diene: for example dicyclopentadiene, ethylidene norbornene or 1,4-hexadiene).

Diene rubbers are, for example, homopolymers of conjugated dienes containing 4 to 8 carbon atoms, such as butadiene, isoprene, piperylene and chloroprene, copolymers of these dienes with one another and copolymers of these dienes with styrene, acrylic or methacrylic compounds (for example acrylonitrile, methacrylonitrile, acrylic acid, methacrylic acid, butyl acrylate and methyl methacrylate).

Of the diene rubbers, butadiene, butadiene/styrene, butadiene/methyl methacrylate, butadiene/butyl acrylate and butadiene/acrylonitrile rubbers are particularly preferred. Acrylate rubbers are, for example, alkyl acrylate rubbers based on one or more $C_{1-8}$ alkyl acrylates, more particularly ethyl, butyl, octyl, 2-ethylhexyl acrylate. These alkyl acrylate rubbers may contain up to 30% by weight monomers, such as vinyl acetate, acrylonitrile, styrene, methyl methacrylate, vinyl ether in copolymerized form. These alkyl acrylate rubbers may also contain small quantities (up to 5% by weight) of crosslinking polyfunctional monomers in copolymerized form. Examples of such monomers are esters of unsaturated carboxylic acids with a polyol (preferably 2 to 20 carbon atoms in the ester group), such as ethylene glycol dimethacrylate; esters of a polybasic carbexylic acid with an unsaturated alcohol (preferably 8 to 30 carbon atoms in the ester group), such as triallyl cyanurate, triallyl isocyanurate; divinyl compounds, such as divinylbenzene; esters of unsaturated carboxylic acids with unsaturated alcohols (preferably 6 to 12 carbon atoms in the ester group) such as allyl methacrylate; phosphoric acid esters, for example triallyl phosphate and 1,3,5-triacryloyl hexahydros-triazine. Particularly preferred polyfunctional monomers are triallyl cyanurate, triallyl isocyanurate, triallyl phosphate, allyl methacrylate.

Other suitable acrylate rubbers are products containing a crosslinked diene rubber of one or more conjugated dienes, such as polybutadiene or a copolymer of a conjugated diene with an ethylenically unsaturated monomer, such as styrene and/or acrylonitrile, as core and an acrylate shell.

Suitable silicone rubbers may be, for example, crosslinked silicone rubbers of units corresponding to the general formulae $R_2SiO$, $RSiO_{3/2}$, $R_3SiO_{1/2}$ and $SO_{2/4}$, where R is a monofunctional radical. The quantities of the individual siloxane units should be gauged in such a way that 0 to 10 mol units of the formula $RSiO_{3/2}$, 0 to 1.5 mol units $R_3SiO_{1/2}$ and 0 to 3 mol units of the formula $SiO_{2/4}$ are present for every 100 units of the formula $R_2SiO$. In these formulae, R may either be a monofunctional saturated $C_{1-18}$ hydrocarbon radical, the phenyl radical or the alkoxy radical or a radical-attackable group, such as the vinyl or mercaptopropyl radical. Preferably at least 80% of all the radicals R are methyl, combinations of methyl and ethyl or methyl being particularly preferred.

Preferred silicone rubbers contain incorporated units of radical-attackable groups, more especially, vinyl, allyl, halogen, mercapto groups, preferably in quantities of from 2 to 10 mol-%, based on all the radicals R.

They may be produced, for example, as described in EP-A-260 558.

Graft polymers obtained by radical polymerization of at least one of the monomers mentioned above in three groups in the presence of at least one rubber (not a thermoplastic rubber) may be used as graft polymers E) in the blends according to the invention. Preferred production processes are emulsion, solution, bulk or suspension polymerization.

Thus, the graft polymers may be produced, for example, by radical emulsion graft polymerization of the vinyl monomers in the presence of rubber latices at temperatures in the range from 50° to 90° C. using water-soluble initiators, such as peroxodisulfate, or redox initiators.

Rubbers already consisting of preformed core-shell rubber particles which consist of two different rubbers may also be used. For example, the shell may consist of polybutadiene rubber or a silicone rubber while the shell may consist of an acrylate rubber (see above and, for example, EP 260 558—core/shell of silicone/acrylate). One or more graft shells may be applied to the rubber particles by simple grafting or by repeated grafting in steps, each graft shell having a different composition. In addition to the monomers to be grafted, polyfunctional crosslinking monomers or monomers containing reactive groups may also be grafted on to obtain certain effects in the blend {see for example EP-A-230 282, DE-OS 3 601 419, EP-A-269 861).

The graft polymers E) generally contain 5 to 90% by weight rubber and preferably 20 to 85% by weight rubber and 95 to 10% by weight and preferably 80 to 15% by weight graft-copolymerized monomers. The rubbers are generally present in these graft copolymers in the form of at least partly crosslinked particles having an average particle size of 0.05 to 5 μm, preferably 0.1 to 2 μm and more preferably 0.1 to 1 μm.

The monomers and rubbers mentioned as preferred or particularly preferred for the vinyl polymers and (meth-)acrylic polymers are also preferred and particularly preferred for the graft polymers.

The polymer blends according to the invention may be produced in various ways. Thus, the starting polymers may be dissolved together in a solvent or solvent mixture. The polymer blend may be obtained by co-precipitation of the polymers by addition of a non-solvent or by dropwise addition of the solution to a precipitant and also by evaporation of the solvent.

Before all the constituents of the blend are finally mixed, individual polymers of the final blend may be mixed on their own. For example, latices of a resin-like copolymer (for example styrene/acrylonitrile copolymer) and a rubber (for example butadiene/acrylonitrile copolymer) may be mixed by co-precipitation before they are blended with the polycarbonate to form the final molding compound.

However, the starting polymers may also be blended in the melt in such mixing units as, for example, extruders, internal kneaders and mixing rolls.

Typical additives may be added to the individual constituents of the blends during or after their production, even in the form of solutions or melts. Typical additives may also be added to the blend during its production. Typical additives may also be added to the final blend, even in the form of solutions or melts.

Typical additives are, for example, stabilizers, nucleating agents, mold release agents, pigments, flame-proofing agents, antistatic agents, fillers, reinforcing materials and fibers in the usual quantities.

More specifically, typical additives are, for example, carbon black, kieselguhr, talcum, kaolin, mica, clays, $CaF_2$, $CaCO_3$, aluminum oxides, aluminum nitride, silicates, barium sulfate both as fillers and reinforcing materials and as nucleating agents; glycerol stearates, pentaerythritol tetrastearate and trimethylol propane tristearate, for example, as mold release agents; glass fibers and carbon fibers for example as fibers; and $TiO_2$, Fe oxides, carbon black and organic pigments as pigments.

The blends according to the invention may be processed in known manner, for example by injection molding or extrusion, to form moldings of any kind, including sheets, films and fibers.

The sheets and films obtained may be subjected to thermoforming. The films may be processed with other films to form composite films. In addition, the blends according to the invention may also be used in other composite materials, for example in combination with fibers and other polymers.

By virtue of the properties mentioned in the foregoing, the moldings produced from the blends according to the invention have advantages over hitherto known materials, more especially for components in the electrical and electronics field, for large housing parts subjected to severe stressing, for the automotive field as bodywork parts and engine compartment parts and for gas-permeable and gas-separating films.

EXAMPLE 1

Polyester 90 g NaOH (2.25 mol), 1.13 g N-ethyl piperidine (0.01 mol) and 310 g 1,1-bis-(4-hydroxyphenyl)-3,3,5-trimethyl cyclohexane (1 mol) were dissolved while stirring in 4400 g water. 4000 g methylene chloride containing 5.36 g p-(1,1,3,3-tetramethylbutyl)-phenol (0.026 mol) and 205.6 g isophthalic acid dichloride (1.013 mol) in dissolved form were then added to the resulting solution with continued stirring, followed by stirring for another hour. The temperature was kept at 20° to 35° C. The organic phase was then separated off and the bisphenolate-free aqueous alkaline phase was discarded. The organic phase was washed with dilute aqueous phosphoric acid and then repeatedly with distilled water until it was free from electrolyte. A colorless polyester was obtained by evaporation of the methylene chloride from the organic phase and was freed in vacuo from residual traces of methylene chloride over a period of 15 hours at 130° C. Measurement of the relative viscosity of the polyester revealed a $\eta_{rel}$ value of 1.313 (as measured in a solution in methylene chloride at 25° C., c= 5 g/l solution). Differential thermal analysis revealed a value of 256° C. for the glass transition temperature ($T_g$) of the polyester.

EXAMPLE 2

Polyester carbonate 82 g NaOH (2.05 mol) and 310 g 1,1-bis-(4-hydroxyphenyl)-3,3,5 -trimethyl cyclohexane (1 mol) were dissolved with stirring in 4300 g water. 3900 g methylene chloride containing 5.36 g p-(1,1,3,3-tetramethylbutyl)-phenol (0.026 mol) and 182.7 g isophthalic acid dichloride (0.9 mol) in dissolved form were then added to the resulting solution with continued stirring. After stirring for 30 minutes, another 64 g NaOH (1.6 mol) were added in the form of a 50% aqueous solution. 27 g gaseous phosgene (0.3 mol) were then introduced into the reaction mixture with continued stirring. After the phosgene had been introduced, 1.13 g N-ethyl piperidine (0.01 mol) were added, followed by stirring for 1 hour. The temperature was kept at 20° to 35° C. throughout. The reaction mixture was worked up as described in Example 1. In this case, too, the aqueous alkaline phase was bisphenolate-free. The isolated and dried polyester carbonate had the following data: $\eta_{rel}$= 1.300, $T_g$=252° C. (both values measured as described in Example 1).

EXAMPLES 3–5

Polyesters

Another 3 polyesters were produced in the same way as described in Example 1; only the starting materials shown in the Table were varied, as shown. The relative viscosity $\eta_{rel}$ and glass transition temperature $T_g$ of the polyesters obtained are shown in the Table.

EXAMPLES 6–8

Polyester carbonates

Another 3 polyester carbonates were produced in the same way as described in Example 2; only the starting materials shown in the Table were varied as shown. The relative viscosity $\eta_{rel}$ and glass transition temperature $T_g$ of the polyesters obtained are shown in the Table.

TABLE

Polyesters (Examples 3–5) and polyester carbonates (Examples 6–8)

| Example | Starting materials in mol | | | | | $\eta_{rel}$ | $T_g$ (°C.) |
|---|---|---|---|---|---|---|---|
| | BPTMC | BPA | TER | ISO | COCl$_2$ | | |
| 3 | 0.50 | 0.50 | 1.013 | — | — | 1.298 | 262 |
| 4 | 1.00 | — | 0.513 | 0.500 | — | 1.287 | 286 |
| 5 | 0.25 | 0.75 | 1.013 | — | — | 1.305 | 236 |
| 6 | 1.00 | — | 0.81 | 0.09 | 0.30 | 1.290 | 299 |
| 7 | 0.25 | 0.75 | 0.25 | — | 0.95 | 1.311 | 187 |
| 8 | 0.25 | 0.75 | 0.25 | 0.25 | 0.70 | 1.335 | 197 |

BPTMC = 1,1-bis-(4-hydroxyphenyl)-3,3,5-trimethyl cyclohexane.
BPA = bisphenol A.
TER = terephthalic acid dichloride.
ISO = isophthalic acid dichloride.
$\eta_{rel}$ = relative viscosity, measured as in Example I.
$T_g$ = glass transition temperature of the polyester or polyester carbonate obtained, as determined by differential thermal analysis.

EXAMPLE 9

Polymers used for the blends according to the invention in addition to polyesters and polyester carbonates:
1. PC-BPA
Polycarbonate of bisphenol A with terminal groups of 4-(1,1,3,3-tetramethylbutyl)-phenol, $\eta_{rel}$=1.302 (as measured in CH$_2$Cl$_2$ solution, c=5 g/l, at 25° C.).
2. PCSI-BPA
Polysiloxane/polycarbonate block copolymer of bisphenol A and 7% by weight bisphenol-A-terminated polydimethyl siloxane blocks (based on block copolymer) with an average polydimethyl siloxane block length $P_n$ of 70 dimethyl siloxane units, $\eta_{rel}$=1.298 (measured as in Example 1), terminal polycarbonate groups as Example 1.
3. APEC 35
Aromatic polyester carbonate of 65% by weight bisphenol A carbonate units and 35% by weight bisphenol A terephthalate units, terminal groups as in Example 1, $\eta_{rel}$=1.311 (measured as in Example 2).
4. PA-AM
Amorphous polyamide of hexamethylenediamine and isophthalic acid, $\eta_{rel}$=2.42 (as measured in m-cresol at 25° C., c=10 g/l solution), Tg=123° C. (as measured by differential thermal analysis).
5. PST
Polystyrene having a weight average molecular weight $\overline{M}w$ of 170,000.

6. PBT

Polybutylene terephthalate, $\eta_{rel}$=1.720 (in phenol/o-dichlorobenzene, 1:1 parts by weight, at 25° C., c=5 g/l solution).

7. PPS

Polyphenylene sulfide produced in accordance with EP 171 021, melt viscosity $\eta_m$=50 Pa×sec (as measured at 306° C. at a shear rate $\tau$ of 100 Pa in a cone-plate viscosimeter)

8. PUR

Thermoplastic polyurethane having a melting range of approx. 200° to 220° C. and a number average molecular weight ($\overline{M}_n$) of 85,700, made up of an oligoester of 1,4-butylene glycol and adipic acid ($\overline{M}_n$ 2,000), 4,4-diphenyl methane diisocyanate and butane-1,4-diol as chain-extending agent, ratio of NCO to OH groups 1.03.

9. SEBS

Partly hydrogenated polystryene/polybutadiene/polystyrene block copolymer (=polystyrene/polyethylene/butylene/polystyrene block copolymer), Kraton G 1651, a product of Shell AG.

10. PB-MMA

Graft polymer of 80% by weight polybutadiene and 20% by weight grafted methyl methacrylate, average rubber particle size 0.4 μm.

11. AC-MMA

Graft polymer of 80% by weight crosslinked butyl acrylate rubber and 20% by weight grafted methyl methacrylate, average rubber particle size 0.5 μm.

12. PB-SAN

Graft polymer of 50% by weight polybutadiene and 50% by weight grafted styrene/acrylonitrile in a ratio by weight of 72:28, average rubber particle size 0.4 μm.

13. AC-SAN

Graft polymer of 60% by weight of a crosslinked butyl acrylate rubber and 40% by weight grafted styrene/acrylonitrile, 72/28 parts by weight, average rubber particle size 0.5 μm.

EXAMPLES 10 to 22

The properties of blends according to the invention are shown in Tables 1 to 3. The blends were mixed in the melt in a twin-screw extruder at temperatures of 265° to 330° C., in each case at the lowest temperature at which effective homogenization of the blend constituents was still possible. The polyesters and polyester carbonates used for the blends were prepared in the same way as described in the Examples, but on a correspondingly larger scale. The $\eta_{rel}$ values of the polyesters and polyester carbonates used were between 1.295 and 1.315 (as measured at 25° C. in $CH_2Cl_2$, c= 5 g/l solution).

TABLE 1

Polymer blends I

| Example | Composition of polymer blend (parts by weight) | | | | | | | | Properties | | |
|---|---|---|---|---|---|---|---|---|---|---|---|
| | APE Ex. 3 | APEC Ex. 7 | APEC Ex. 8 | PC-BPA | PCSI-BPA | APEC35 | PA-AM | PST | Vicat B °C. | $a_k$ kJ/m² | Remarks |
| 10 | 50 | | | 50 | | | | | 202 | 23 | F |
| 11 | | 50 | | | 50 | | | | 170 | 37 | FF |
| 12 | 30 | | | | | 70 | | | 196 | 24 | F |
| 13 | | 70 | | | | | 30 | | 171 | 14 | FF/B |
| 14 | | | 95 | | | | | 5 | 195 | 21 | F |

Vicat B (°C.) = Vicat softening temperature VST/B/120 according to ISO 306 DIN 53 460, small standard test specimens
$a_k$ = notched impact strength at 23° C. according to ISO 179 DIN 53 453, small standard test specimens
F = good melt flow
FF = particularly good melt flow
B = gasoline-resistant (specimen 80 × 10 × 4 mm, stored for 5 mins at 25° C. in a mixture of toluene and isooctane, 1:1 parts by weight, with 0.6% outer fiber strain), i.e. no cracks in the test specimens after storage
APE = polyester
APEC = polyester carbonate

TABLE 2

Polymer blends II

| Example | Composition of polymer blend (parts by weight) | | | | | | | | | | | Properties | | |
|---|---|---|---|---|---|---|---|---|---|---|---|---|---|---|
| | APE Ex. 5 | APEC Ex. 7 | APEC Ex. 8 | PC-BPA | PCSI-BPA | PBT | PPS | PUR | SEBS | PB-MMA | AC-MMA | Vicat B °C. | $a_k$ kJ/m² | Remarks |
| 15 | 48 | | | 48 | | | | | 4 | | | 187 | 21 | B, F |
| 16 | | 35 | | 35 | | | | 20 | | 10 | | 152 | 37 | B, FF |
| 17 | | | 55 | | | | 30 | | | | 15 | 156 | 22 | B, FF |
| 18 | 55 | | | | | | | 30 | | | 15 | 227 | 11 | B, F |

Vicat B (°C.) = Vicat softening temperature VST/B/120 according to ISO 306 DIN 53 460, small standard test specimens
$a_k$ = notched impact strength at 23° C. according to ISO 179 DIN 53 453, small standard test specimens
F = good melt flow
FF = particularly good melt flow
B = gasoline-resistant (specimen 80 × 10 × 4 mm, stored for 5 mins at 25° C. in a mixture of toluene and isooctane, 1:1 parts by weight, with 0.6% outer fiber strain), i.e. no cracks in the test specimens after storage
APE = polyester
APEC = polyester carbonate

TABLE 3

| | Polymer blends III | | | | | | | | | |
|---|---|---|---|---|---|---|---|---|---|---|
| | Composition of polymer blend (parts by weight) | | | | | | | Properties | | |
| Example | APEC Ex. 8 | APEC Ex. 7 | APEC Ex. 5 | PB-MMA | PB-SAW | AC-MMA | AC-SAN | Vicat B °C. | $a_k$ kJ/m² | Remarks |
| 19 | 75 | | | 25 | | | | 178 | 34 | B |
| 20 | | 80 | | | 20 | | | 173 | 42 | B, FF |
| 21 | | | 80 | | | 20 | | 208 | 24 | B, F |
| 22 | 85 | | | | | | 15 | 185 | 28 | B |

Vicat B (°C.) = Vicat softening temperature VST/B/120 according to ISO 306 DIN 53 460, small standard test specimens
$a_k$ = notched impact strength at 23° C. according to ISO 179 DIN 53 453, small standard test specimens
APE = polyester
APEC = polyester carbonate

What is claimed is:

1. A thermoplastic molding composition comprising a blend of
    A) 1 to 99% by weight of a polyester carbonate derived from
        a) aromatic diphenols,
        b1) at least one member selected from the group consisting of aliphatic acid, cycloaliphatic acid and aromatic dicarboxylic acid, and
        b2) carbonic acid
    wherein said b1) is present in an amount of more than about 0.1 mol-percent and wherein said b2) is present in an amount of up to 99.9 mol-percent, said percent being relative to the total molar amount b1) and b2) and wherein 0.1 to 100 mol-% of said a) consists of diphenols corresponding to

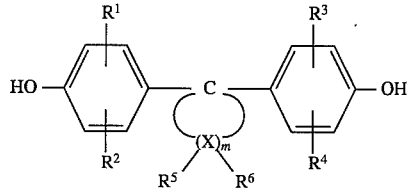

in which $R^1$, $R^2$, $R^3$ and $R^4$ independently represent a hydrogen atom, a $C_{1-2}$ hydrocarbon radical or a halogen atom, m is an integer of 4 to 5, $R^5$ and $R^6$ are individually selected for each X and, independently of one another, represent a hydrogen atom or a $C_{1-6}$ alkyl radical and X is carbon, with the proviso that at least one atom X, $R^5$ and $R^6$ are both alkyl radicals, and at least one member selected from the group consisting of B) 0 to 99% by weight of an amorphous thermoplastic resin which is different from (A) and which has a glass transition temperature of 40° to 300° C., C) 0 to 99% by weight of a crystalline thermoplastic resin having a melting temperature of 60° to 400° C., D) 0 to 99% by weight of a rubber, and E) 0 to 99% by weight of a graft polymer of at least one rubber with at least one grafted-on polymer of at least one monomer from the group consisting of vinyl compounds, acrylic and methacrylic compounds and maleic acid derivatives, in which the sum of A), B), C), D) and E) is 100% by weight.

2. The composition of claim 1 wherein said m is 5.

* * * * *